United States Patent Office 2,758,940
Patented Aug. 14, 1956

2,758,940

METHODS OF FORMING BODIES OF DEHYDROGENATED HYDROCARBON POLYMERS

William O. Baker, Morristown, and Field H. Winslow, Springdale, N. J., assignors to Bell Telephone Laboratories, Incorporated, New York, N. Y., a corporation of New York No Drawing. Application April 28, 1951, Serial No. 223,638

9 Claims. (Cl. 117—33.3)

This invention relates to methods of forming thermally dehydrogenated products of certain relatively high molecular weight, highly cross-linked hydrocarbon polymers.

More particularly the invention relates to the dehydrogenation of shaped bodies of polymers formed from a polymerizable material containing at least 50 per cent by weight of monomers, the molecules of which are made up of an aromatic hydrocarbon nucleus having substituted thereon a sufficient number of unsaturated aliphatic hydrocarbon substituents to produce a functionality of at least six. An outstanding polymer of this class is polymerized trivinyl benzene and it is in connection with the dehydrogenation of this polymer that the invention will first be described.

The dehydrogenation is accomplished by heating the hydrocarbon polymer to a sufficiently high temperature in a non-oxidizing atmosphere to drive off the required amount of hydrogen from the hydrocarbon. By limiting the temperature to which the hydrocarbon is heated or the time of heating, and thus controlling the degree of dehydrogenation, a wide variety of dehydrogenation products having useful properties can be produced. Coupled with the dehydrogenation, there is of necessity some rearrangement of the network of carbon atoms forming the base of the polymeric hydrocarbon molecules, but the degree of dehydrogenation is a measure of this rearrangement.

The products range from the mildly dehydrogenated non-conductive substances, containing for instance about 6 per cent hydrogen by weight and produced by heating at about 250° C., which are useful in the form of films as optical filters, through the more highly dehydrogenated products which show increasing electrical conductivity and exhibit photoconductivity and which are useful as radiation counters, up to the substantially completely dehydrogenated carbon materials which are produced by heating to temperatures from about 850° C. to about 1300° C. or higher and which are capable of a variety of uses as will be discussed below.

With few exceptions, the pyrolysis of high molecular weight hydrocarbon polymers proceeds almost exclusively by the formation of hydrocarbon molecular fragments which volatilize leaving little or no carbon residue. Certain hydrocarbon polymers, such as polydivinyl benzene, which are sufficiently cross-linked, can have inhibiting groups incorporated in them, as by baking in air, which sufficiently retard the rate of breaking off of hydrocarbon molecular fragments during pyrolysis to permit the polymer to undergo a substantial dehydrogenation which results in a substantial carbon residue. The formation of carbon residues in this manner is more particularly described in the copending application of William O. Baker and Richard O. Grisdale, Serial No. 223,633, filed on the same day as the present application, and which has since issued as U. S. Patent 2,697,028.

In the dehydrogenation process of the present invention, the incorporation of inhibiting groups, as by air baking, is unnecessary. With the particular type of polymer employed, simply heating in a non-oxidizing atmosphere will ultimately produce a yield of carbon at least as great as, and in many cases greater than, can be produced with other hydrocarbon polymers which have been subjected to an air baking pretreatment. However, even with the polymers used in the process of the present invention, a somewhat greater carbon yield can be obtained by baking the polymers in air prior to pyrolysis.

The dehydrogenation proceeds without any change in the shape of the original polymer body although the total volume, both apparent and actual, shrinks due to the loss of the hydrogen and a portion of the carbon by volatilization. When the initial polymer body is of a size exceeding 2 millimeters in cross-section, there may be a tendency for this shrinkage in size to cause a cracking of the resulting carbon body unless steps are taken to avoid this cracking as will be discussed more fully below. However, polymer bodies not exceeding this size can be converted to carbon replicas of a variety of shapes such as spheres, filaments or films.

The original shaped polymer body may be formed in any convenient manner. Thus one of the monomers referred to above, or a mixture of two or more of these monomers with each other or a mixture of one or more of these monomers with up to 50 per cent of another polymerizable monomer, may be polymerized in the desired shape in the conventional manner to an infusible state. Alternatively, the monomers can be partially polymerized and the partially polymerized material, while still plastic, can be formed in the desired shape and subjected to complete polymerization. Polymerization can conveniently be accomplished by adding about 1 per cent by weight of benzoyl peroxide to the material to be polymerized and then heating it to a temperature at which polymerization occurs at a practical rate, as for instance at temperatures between 60° C. and 150° C.

As is known in the art, polymerization may be accomplished with larger or smaller amounts of benzoyl peroxide as, for instance, between 0.5 per cent and 4 per cent. Other polymerization catalysts such as cumene hydroperoxide, t-butyl hydroperoxide, 1-hydroxy cyclohexyl hydroperoxide-1, lauryl peroxide, stearyl peroxide or other acyl peroxides can be used in amounts comparable to those used for benzoyl peroxide. Promoters such as cobalt naphthenate, iron naphthenate, dimethyl aniline, ethyl mercaptan, butyl mercaptan, dodecyl mercaptan, or azo bis-butyronitrile may be used with the polymerization catalyst, if desired, in any suitable amount as, for instance, between .05 per cent and 0.2 per cent by weight of the polymerizable material.

In order to obtain substantial yields of carbon it is necessary that the polymerization be carried sufficiently far to produce a certain minimum degree of cross-linking. This degree of cross-linking is present when the polymer body does not swell to more than five times its original volume when brought to equilibrium in a thermodynamically inert solvent (having no substantial heat of solution), such as benzene or carbon tetrachloride. Preferably the polymerization is continued until the swelling under these conditions is less than 1.25 times the initial volume and best results are obtained when the swelling is negligible.

The shaping of the material which is polymerized may be accomplished in a variety of ways. One of the most useful forms of the carbon which is ultimately produced is in the shape of small spheres. Spherical polymer shapes, from which such carbon spheres can be produced, can be formed by the so-called pearl or bead polymerization. In the formation of polymer spheres by this method, the material to be polymerized is agitated, as by rapid stirring, together with a body of a non-solvent suspension liquid, such as water. Under the influence of the continuing agitation, the material to be polymerized breaks up into spherical globules dispersed in the suspension liquid. The entire system is maintained at a polymerizing temperature until rigid, non-tacky polymer spheres are produced. The polymerization in suspension can be continued until the requisite degree of cross-linking, as set forth above, has been achieved or the polymer spheres can be removed from the suspension after they have become rigid and non-tacky and can be subsequently heated to complete their polymerization.

The manner in which a partial yield of polymer spheres of mixed sizes can be produced by this method is known to the art. A procedure by which high yields of spheres falling within a narrow size range can be produced is described and claimed in the copending application of F. H. Winslow, Serial No. 182,309 filed August 30, 1950, and which has since issued as U. S. Patent 2,712,536.

According to this procedure, a liquid mass of material to be polymerized, which contains a polymerization catalyst, is rapidly stirred by a rotary stirrer into suspension in at least five times as much by volume, and preferably ten to fifteen times as much by volume, of water or an aqueous solution of an inorganic salt, the pH of which is maintained at a value between 3 and 7 and which has dissolved in it between 0.25 per cent and 5 per cent, and preferably about 2 per cent, of a suspension stabilizing agent comprising polyvinyl alcohol having a degree of hydrolysis of at least 95 per cent, and preferably at least 98 per cent, and having an intrinsic viscosity in aqueous solution of between 0.3 and 0.9. The temperature of the system is maintained between about 60° C. and 100° C., and preferably between about 75° C. and 85° C., until the suspended spheres have polymerized to a rigid, non-tacky state.

In this process, an increase in the rate of agitation and an increase in the concentration of the polyvinyl alcohol in the aqueous suspension medium tend to decrease the size of the spherical polymer particles which are produced. Similarly, the use of polyvinyl alcohols of decreasing degrees of hydrolysis or of increasing intrinsic viscosities tends to decrease the size of the spheres. With polyvinyl alcohols having degrees of hydrolysis and intrinsic viscosities falling within the range set forth above, a high yield of unagglomerated spheres, the greater proportion of which have a diameter falling within a narow range of size distribution, can be obtained with average diameters lying between .05 millimeter and 1.5 millimeters. Larger spheres can be obtained in lower yield by decreased agitation and lower concentrations of polyvinyl alcohol, particularly when the lower viscosity grades of polyvinyl alcohol are used. When it is desired to produce spheres of smaller diameter, down to .005 millimeter for instance, a polyvinyl alcohol of lower degree of hydrolysis, for instance about 77 per cent, and a higher intrinsic viscosity, for instance about 1.0, may be used.

As indicated above, the spheres obtained in this process may either be fully polymerized to the requisite degree of cross-linking for subsequent pretreatment and pyrolysis or be brought to this degree of cross-linking by subsequent heating after removal from suspension. The fraction of the polymerized material which is removed from suspension as agglomerated spheres, rather than individual spheres, can be treated in the same manner to produce agglomerated carbon spheres useful for some purposes.

In a similar manner, carbon rods or filaments of various diameters can be produced according to the process of the present invention by first forming polymer rods or filaments. The formation of such polymer rods or filaments can conveniently be accomplished by inserting the monomer or monomer mixture, containing the requisite polymerization catalyst, in a glass capillary tube of the desired diameter and gradually moving the tube longitudinally into a zone in which a polymerizing temperature is maintained, so that the monomer polymerizes gradually from one end of the tube to the other. This method of polymerization minimizes cracking from the large volume shrinkage during polymerization. After the polymer has achieved the required degree of cross-linking, it can be removed from the tube, as by breaking away the tube or dissolving it. The resulting polymer rod or filament can be converted to carbon by the process of the present invention. This method of polymerization is also particularly adapted to the formation of polymers from vinyl aromatic compounds, particularly from trivinyl benzene or a mixture of this substance with other polymerizable materials, particularly divinyl or monovinyl benzenes.

The process of the present invention can also be used for forming an adherent carbon film on various surfaces. This is accomplished by forming a film of the hydrocarbon to be pyrolyzed and converting the film to carbon. The film can be formed on the surface of any material sufficiency stable and refractory to be subjected to the temperatures required for pyrolysis, such as ceramics, glasses, crystals, or metals having melting points substantially above the temperatures of pyrolysis. The coatings can be applied to rods, wires, spheres, tubes (both internally and externally) and other complex forms which it is difficult or impossible to cover with a coherent carbon layer by gas phase pyrolysis.

The hydrocarbon films, to be converted to carbon films, can be deposited in any convenient manner. Thus any of the liquid hydrocarbon monomers or monomer mixtures, containing a polymerization catalyst, can be coated on the surface and then maintained at a polymerizing temperature until a polymer of the required degree of cross-linking has been produced. Similarly, the monomer or a partially polymerized material which is still soluble may be dissolved in a volatile solvent, the solution may be coated on the surface, the solvent may be allowed to evaporate and the monomer or partially polymerized material may be further polymerized. This polymer film can be subjected to the inhibitor forming pretreatment, if required, and then to pyrolysis.

The formation of highly cross-linked, depolymerization resistant hydrocarbons into various shapes for conversion by pyrolysis into carbon bodies has been described above. These hydrocarbons may also be formed as impregnants or binders for other organic or inorganic masses, such as natural and synthetic fibers (including cellulosic, silk or polyamide fibers, or carbon fibers produced as described above) or coke or carbon black particles. The hydrocarbons may be formed by the methods described above, as by impregnating or saturating the materials with a monomer or monomer solution and polymerizing the monomer. The entire mass can then be carbonized by the process of the present invention.

The dehydrogenation proceeds without any substantial change in the shape of the original polymer body although the total volume, both apparent and actual, shrinks due to the loss of the hydrogen and a portion of the carbon by volatilization. When the initial polymer body is of a size exceeding 2 millimeters in cross section, there may be a tendency for this shrinkage to cause a cracking and warping of the resulting carbon body.

This tendency of the body to crack and warp can be reduced or avoided by the application of mechanical pressure to the body during the dehydrogenation process. Pressures of the order of 2 to 10 pounds per square inch are ordinarily adequate to achieve these results although higher pressures may advantageously be used up to 100 pounds per square inch, 500 pounds per square inch or even 1000 pounds per square inch.

Thus, when flat carbon plates are formed by the dehydrogenation of polymer sheets or of one or more layers of a textile fabric impregnated with the polymer, the sheets ordinarily tend to warp substantially during dehydrogenation. If the sheets are restrained, during dehydrogenation, between flat surfaces under a pressure of several pounds per square inch, this warping is avoided.

Similarly, if other polymer shapes, such as blocks having, for instance, cross-sections of the order of one-half inch, are constrained in molds of the appropriate shape under pressures of the order of several pounds per square inch or more, cracking and warping during dehydrogenation will be eliminated or materially reduced. In such bodies, the presence of carbonizable fillers such as cotton flock, or preferably the presence of filaments or fabrics of carbonizable material, distributed throughout the polymer mass, act to reinforce the bodies and to assist in the reduction of cracking.

The pyrolysis of the hydrocarbon polymer is carried out in a non-oxidizing atmosphere, at least during all portions of the operation at which the temperature is above 250° C. and preferably throughout the entire operation, in order to prevent loss of carbon by oxidation.

The most suitable atmosphere for this purpose is nitrogen at atmospheric pressure, although superatmospheric or subatmospheric pressures may be used if desired. Other atmospheres which are non-oxidizing, such as helium, hydrogen or a sufficiently high vacuum, may be used if desired.

The hydrocarbon bodies are brought gradually to the maximum temperature of pyrolysis so as to allow the gradual release of the gases which are developed and thus prevent destruction of the bodies. It has been found that a temperature rise of about 200° C. per hour between about 300° C. and the maximum temperature yields desirable results. Obviously the bodies may be heated more slowly if desired, as for instance at an average rate of about 5° C. per hour. A more rapid rate of heating, up to about 500° C. per hour, may also be used. It is apparent that, although the temperature increase can be made continuous, it is more readily brought about by stepwise increases, for instance of the order of 25° C. to 100° C. apart.

The residual amount of hydrogen remaining in the final carbon product is dependent upon the maximum temperature to which the bodies are brought during pyrolysis for a substantial period of time. A product consisting of at least 99 per cent carbon can be produced by carrying the pyrolytic temperature to 850° C. and maintaining the material at this temperature for one-half hour or more.

In a typical product, subjected to pyrolysis at a temperature increasing at the rate of 200° C. per hour until a temperature of 900° C. was reached and maintained at that temperature for one-half hour, the hydrogen content was found to be 0.64 per cent by weight. After being maintained at 1000° C. for one hour, the hydrogen content was reduced to 0.36 per cent. The hydrogen content was reduced further to 0.23 per cent by heating one hour at 1100° C., to 0.12 per cent by heating one hour at 1200° C. and to between 0.02 per cent and 0.01 per cent by heating one to three hours at 1300° C. These values represent a hydrogen content of one hydrogen atom per twenty-three carbon atoms in the product heated to 1000° C. and one hydrogen atom per four hundred to eight hundred carbon atoms in the product heated to 1300° C.

As stated above, the pyrolysis of the polymer body from which the carbon is formed is carried out, above 250° C., and preferably even below, in a non-oxidizing atmosphere. Yields of carbon up to, or greater than, 50 per cent of the weight of the original polymer, can be obtained without any pretreatment. However, some improved yield of carbon can be obtained by an air baking of the polymer body prior to pyrolysis.

Thus, spheres of polymerized trivinyl benzene prepared by the suspension polymerization method described above and having diameters lying between 0.25 millimeter and 0.42 millimeter underwent a weight loss of 55.9 per cent (from their weight at 250° C.) when heated, under a pressure of a few microns of mercury, up to 1000° C. by raising the temperature in steps of 25° C. every fifteen minutes. A preliminary baking of the polymer spheres in air prior to pyrolysis decreased the weight loss as follows, the residuum in each case being all carbon except for insignificant amounts of residual hydrogen:

| Time at 250° C. in Air (Hours) | Weight Loss After Heating to 1,000° C. (Percent) |
| --- | --- |
| 0 | 55.9 |
| 4 | 54.1 |
| 8 | 52.0 |
| 24 | 49.3 |
| 64 | 46.1 |

The effect of the air baking appears to be the result of the introduction of oxygen into the polymer molecule in side chains or groups to form radicals which have an inhibiting effect upon carbon-to-carbon bond scission during pyrolysis without substantially retarding dehydrogenation. The amount of oxygen taken up by the polymer during air baking may constitute as much as 15 per cent by weight of the resultant material if the baking is carried on for a prolonged period.

The oxygen taken up in this manner has substantially no effect upon the nature of the carbon produced, as contrasted with the effect of oxygen contained directly in the linkages of polymeric networks as in regenerated cellulose, phenolic resins or polyester resins. The latter type of oxygen appears to have a definite graphitizing effect since polymer bodies containing oxygen of this type leave a carbon residue which is far more graphitic in structure than the carbon produced by the process of the present invention and which is readily converted to a completely graphitic state by heating at 2400° C.

As stated above, it is an advantage of the polymers used in the process of the present invention that their inherent structure is such that bodies formed of them can be subjected to pyrolysis to give a high yield of compact, coherent carbon bodies of the same shape having unique properties without necessarily being subjected to any additional treatment to inhibit scission of carbon-to-carbon bonds. A study of the progress of gas evolution during pyrolysis reveals a significant difference between the behavior of the polymers and that of other hydrocarbon polymers which require a preliminary air baking in order to give a substantial carbon residue. The rate of evolution of low molecular weight gases, such as methane and hydrogen, which have a relatively high hydrogen-to-carbon ratio, was measured by continuously exacuating the pyrolytic furnace chamber at a constant rate so as to maintain a pressure of a few microns of mercury. A liquid nitrogen trap was placed between the furnace and the evacuating pump so as to remove the condensable gases which were evolved. These condensable gases were of higher molecular weight and had a lower hydrogen-to-carbon ratio. A pressure gauge was placed between the nitrogen trap and the evacuation pump.

The condensable gases were removed by the liquid nitrogen trap and had no substantial effect upon the pressure as measured by the pressure gauge. The pressure reading on the pressure gauge therefore gave an indication of the rate of evolution of non-condensable gases.

Pyrolysis was carried out by heating the material in the furnace by raising the temperature in steps of 25° C. every fifteen minutes until a temperature of 1000° C. was reached. It was found that, with polymerized trivinyl benzene bodies, the maximum evolution of non-condensable gas occurred at approximately 475° C. This may be contrasted with the behavior of a polymer of five parts by weight of divinyl benzene and four parts by weight of vinyl ethyl benzene. This polymer, without preliminary air baking, gives a carbon yield, upon pyrolysis, of 6 or 7 per cent and evolves substantially no non-condensable gases during pyrolysis. With a preliminary air baking at 250° C. sufficient to raise the carbon yield to about 50 per cent, there is a substantial evolution of non-condensable gases which occurs at about 700° C. It is therefore apparent that dehydrogenation proceeds more readily with the polymers used in the process of the present invention.

Any polymer can be used in this process which is formed by the polymerization of a monomer made up of an aromatic hydrocarbon nucleus having substituted thereon a sufficient number of aliphatic radicals containing a sufficient number of unsaturated carbon-to-carbon bonds to impart to the monomer a functionality of at least six. The aromatic nucleus of the monomer may be any of the aromatic nuclei but ordinarily will not contain more than three rings and may be either condensed as in naphthalene, anthracene or phenanthrene or separate as in dipheny or mixed as in phenyl naphthalene. Most commonly, the nucleus will be a benzene ring. Nuclei containing more than three rings, such as pyrene or benzanthracene, can also be used if desired, but monomers of such structure are not as readily available.

Any unsaturated aliphatic hydrocarbon substituents can be used on the aromatic nucleus. The aromatic nucleus may also carry saturated aliphatic hydrocarbon substituents in addition to the unsaturated substituents. In most instances the aliphatic hydrocarbon substituents will not contain more than six carbon atoms although larger chains containing up to twelve atoms or more may sometimes be found desirable. The unsaturation may be olefinic or acetylenic. Each olefinic double bond contributes a functionality of two to the monomer whereas each acetylenic triple bond contributes a functionality of four.

In order to have the required functionality of six, the monomer should therefore contain at least three olefinic bonds, or at least two triple bonds, or at least one olefinic bond and one triple bond. The unsaturated bonds may be contained in one aliphatic hydrocarbon substituent but are preferably distributed among two, three or more such substituents. Among the suitable substituent groups may be mentioned vinyl, allyl, crotyl, butadienyl, ethinyl, allylene or propargyl radicals.

The most suitable monomers for forming polymers to be subjected to pyrolysis are the trivinyl compounds, particularly trivinyl benzene. Monomer mixtures are particularly desirable if they contain at least 50 per cent of such compounds. Examples of other monomers are trivinyl naphthalene, trivinyl anthracene, divinyl monoethinyl benzene, vinyl ethinyl benzene, triallyl benzene and divinyl allyl benzene.

As indicated above, the polymers may be formed of mixtures of these monomers with each other or with up to 50 per cent by weight of other polymerizable monomers. These other monomers may have a functionality of only two, as in styrene, or may be of higher functionality.

The electrical resistivity at 25° C. of the carbon produced as described above varies between about $10^5$ ohm-centimeters for a hydrogen content of about 1 per cent and $10^{-2}$ ohm-centimeters (about three hundred times the resistance of graphite) for a hydrogen content not exceeding about .02 per cent. The hardness of the product is higher than that of any carbon yet recorded, other than diamond.

These properties indicate that, although during pyrolysis the carbon network of the original hydrocarbon has undergone substantial rearrangement to the aromatic or graphitic configuration as occurs in the formation of all pyrolytic carbons, nevertheless a substantial proportion of primary valence cross-links between the graphitic layers is retained and imparts substantial diamond-like characteristics to the product. The carbons of the present invention, which will be referred to hereafter as polymer carbon, therefore have a more cross-linked, less graphitic structure than any other known forms of carbon except diamond.

The existence of this type of structure is further indicated by a comparison of the X-ray diffraction pattern produced by polymer carbon with the patterns for graphite and the other known pyrolytic carbons, such as those obtained by the gas phase pyrolysis of hydrocarbons or the in situ pyrolysis of oxygenated polymeric materials. The pattern for graphite shows a large number of high angle maxima resulting from the high degree of order in the graphitic structure. These high angle maxima are absent in the patterns of not only polymer carbon but also other known pyrolytic carbons. However, the features which do appear in the patterns are much more diffuse for polymer carbon than for the other pyrolytic carbons, indicating a considerably lesser degree of order. This lesser order is presumably associated with a higher degree of cross-linking between graphitic planes, resulting in skewness of the six membered carbon rings.

Even more striking is the stability of the disordered structure when polymer carbon is heated to temperatures which graphitize ordinary pyrolytic carbon. Thus, a layer of pyrolytic carbon, such as is deposited on the inside of a carbon tube by passing benzene vapor therethrough at 800° C., is readily converted to graphite by heating several hours at 2400° C. In contrast, polymer carbon heated at 2400° C. for eight hours produced an X-ray pattern in which the features were somewhat less diffuse but in which there appeared no new orders or other features characteristic of graphite. This is extraordinary structure stability for disordered carbon and is further evidence of the extensive cross-linking between graphitic planes which appears to be responsible for some of the unique properties of polymer carbon.

Bodies of polymer carbon display intense sorptive capacity, quickly taking up helium, nitrogen, oxygen, water vapor and other gases when exposed to the atmosphere. The surfaces of these bodies exhibit an unusual smoothness. Electron micrographs of surface replicas of these surfaces at magnifications up to 14,000 show an essentially smooth surface with occasional small craters but with substantially no outward projections. The absolute density of the carbon is somewhat greater than two. A comparison of the absolute volume of the carbon in the bodies with the apparent volume of the bodies shows that the carbon occupies somewhat less than one-half the apparent volume, the remainder being made up of pores of exceptional fineness.

Because of this surface smoothness and freedom from outward projections, and because of the high sphericity obtainable in the production of polymer carbon spheres by the methods described above, masses of these spheres possess an exceptionally high fluidity. This fluidity can be measured by the angle of repose of a mass of the spheres. The cotangent of the angle of repose has been measured as about 2.15.

When used as microphone granules in carbon-type microphones, polymer carbon bodies have been found to exhibit exceptionally high modulation efficiency. The modulation is measured as the ratio of the change in resistance of a mass of granules to the average resistance of the mass, when the mass is subjected to cyclical mechanical compression of a chosen frequency and amplitude. When measured in an enclosed vessel having one movable wall which oscillated at a frequency of 1000 cycles per second and with an amplitude of several hundred angstroms, polymer carbon spheres, having diameters lying between about .25 millimeter and about .3 millimeter, were found to have a modulation of 33 per cent as compared with a modulation of 13 per cent for anthracite granules and about 17 per cent for quartz spheres coated with pyrolytic carbon deposited from a hydrocarbon in the gas phase. Even higher modulations (38 per cent) were obtained with mixtures of polymer carbon sphere agglomerates, of the same particle size, mixed in proportions such as to reduce the fluidity of the mass so that the cotangent of its angle of repose is 1.3, or close to the average fluidity of anthracite microphone granules.

Another advantage of the polymer carbon spheres or sphere-aggregate mixtures for microphonic purposes is the fact that the density lies within the desirable range for such use. The apparent density (or the weight of a particle divided by the volume within the envelope of the particle, as determined by measuring the volume of the particles by the displacement of a liquid which does not wet the pores, such as alcohol, xylene, or mercury) can be varied over a range from about 1.6 grams per cubic centimeter to about 1 gram per cubic centimeter by control of the materials from which the carbon is formed. This controllable density combined with controllable resistivity and controllable fluidity considerably widen design potentialities for microphones in which the polymer carbon particles are to be used. These advantages are present whether the inherently good modulation of the polymer carbon surfaces is used or the polymer carbon granules are subsequently coated with a layer of pyrolytic carbon deposited from a hydrocarbon in the gas phase.

In the formation of polymer carbon spheres for microphonic use, it has been found that the presence of even minute amounts of oxygen and water vapor in the atmosphere during pyrolysis strongly affects the microphonic properties of the resulting carbon. The material is particularly sensitive to oxygen and water vapor during the final phase of the pyrolysis at temperatures from about 950° C. and 1200° C.

Therefore, in order to achieve the best microphonic properties with satisfactory reproducibility, it is necessary to insure the exclusion of all oxygen and water vapor from the atmosphere of the pyrolytic furnace and to take extraordinary precautions to assure gas-tight furnace connections. When nitrogen is used to sweep the gaseous pyrolytic products from the furnace, it can be freed of oxygen and water vapor prior to its introduction into the furnace by adding about 15 per cent hydrogen and passing the mixture first through a palladium catalyst and then through a drying tower filled with granular calcium hydride.

The unique properties of polymer carbon spheres, and bodies of other shape, adapt them to a variety of other uses. The perfect sphericity of the spheres, coupled with their smoothness, hardness and availability in a variety of small sizes, make them well suited for forming ball bearings for instruments, watches and other delicate machinery. A vapor-deposited graphitic coating can be applied to the spheres for this use to impart permanent lubricating qualities.

Masses of polymer carbon spheres can be used as absorbents for use with gaseous or liquid media. They can be used as filter beds. They can be used as catalytic materials or as catalyst carriers, where their refractoriness and high fluidity are of considerable value, particularly when the material is used as a fluidized catalyst. They can be used for forming chromatographic columns. The change in contact resistance between the spheres in the presence of certain gases makes them useful as electrical gas detectors. The high fluidity of the spheres and their stability at very high temperatures fits them very well for use as flowing heat transfer media.

Filaments of polymer carbon are useful as electrical resistance elements and as incandescent lamp filaments. For these uses, filaments of hydrocarbon polymer can be coiled to the required shape, about a base if necessary, prior to pyrolysis.

Refractory bodies coated with films of polymer carbon can be used for electrical resistors. The method of the present invention lends itself well to the formation of resistors in printed circuits. Microphone granules can be prepared by forming films of polymer carbon on spheres of quartz or other refractory material. Polymer carbon bodies or polymer carbon films on ceramic or metal bodies form excellent electrical contact surfaces for electrical switches. Polymer carbon films may also be formed as inert linings in crucibles or kettles.

The extreme hardness of polymer carbon makes it useful as an abrasive. The abrasive properties can be utilized by forming sharp-edged particles, as by the crushing of polymer carbon spheres or other shapes or by scraping flakes of a polymer carbon film from a base on which it is formed. These particles can be used as a substitute for diamond dust for some purposes and can be formed, with conventional binders, into abrasive-coated papers and fabrics, grinding wheels or similar devices.

Similar flakes which are exceedingly thin and of small particle size can be used as fillers or pigments for plastics, paints and rubbers in place of carbon. Due to their flake form, these particles are exceptionally effective in forming a light screen to protect the plastic or rubber from deterioration and they have good hiding power when used in paints. Where electrically conductive plastics or rubber compositions are desired, particularly effective fillers are formed from thin filaments of the carbon, which break up into thin rods of small particle size.

The description above has been concerned primarily with the formation of materials which have been dehydrogenated to a hydrogen content not exceeding 1 per cent by weight by heating to temperatures above 850° C. However, as indicated above, products with useful, though different, properties are obtained with much lesser degrees of dehydrogenation by heating at lower temperatures.

Dehydrogenation of cross-linked hydrocarbon polymers, and resultant rearrangement of the basic carbon configuration, begins with heating at even relatively mild temperatures. This can be observed by forming a cross-linked hydrocarbon polymer either as a self-supporting film or as a coating on a transparent base such as glass and subjecting the polymer to heating in an inert atmosphere. A film of the polymers used for the present invention is, prior to heating, transparent throughout the visible spectrum with a relatively sharp cut-off in the ultra-violet region. Heating the film at 200° C. for one-half hour shifts this cut-off to longer wavelengths at the violet end of the visible spectrum. Heating at 400° C. for one-half hour shifts the cut-off to the blue-green region of the visible spectrum. Further heating shifts the absorption band further toward the red end of the spectrum. Films of any of the polymers described above as sources of polymer carbon, when treated in the manner, form useful optical filters.

The absorption spectra of these substances, as they go through progressive dehydrogenation with heating, show the progressive changes in energy levels of the electrons in the polymer molecules, which, as the absorption shifts toward the red, become electronic semiconductors and photoconductors.

Optical filters as described above can also be made by heating in air up to the required temperature, not exceeding about 250° C. and, if desired, heating to higher temperatures in nitrogen or other non-oxidizing atmosphere.

Useful optical filters can be obtained with cross-linked hydrocarbon polymers which have been dehydrogenated, by heating, to a hydrogen content between about 3 per cent and about 6 per cent by weight of the dehydrogenated material, covering cut-off ranges from the upper end of the visible spectrum for the less dehydrogenated material to well into the infra red region for the more highly dehydrogenated material.

Within this range of dehydrogenation the materials develop photoconductive properties. The photoconductive properties are found with a range of dehydrogenation corresponding to a hydrogen content extending from about 5 per cent to about 1 per cent by weight of the dehydrogenated material. These dehydrogenated hydrocarbon polymers are useful for forming photoconductive devices such as radiation counters. Dehydrognated materials falling within this range also exhibit thermoconductivity and are useful for forming thermistors and varistors. The dehydrogenated materials are prepared by the same techniques as described above in connection with the more highly dehydrogenated polymer carbon, except that the final pyrolysis is carried out at a lower ultimate temperature at which the amount of hydrogen remaining in the product falls within the ranges set forth above. These temperatures will vary between 400° C. and 850° C. depending upon the degree of dehydrogenation desired and upon the nature of the original hydrocarbon polymer.

The invention has been described in terms of its specific embodiments and, since certain modifications and equivalents may be apparent to those skilled in the art, this description is intended to be illustrative of, but not necessarily to constitute a limitation upon the scope of the invention.

What is claimed is:

1. The method which comprises heating a body of a polymer of trivinyl benzene in a non-oxidizing atmosphere to a temperature of at least 200° C. until the hydrogen content has been reduced to not more than 6 per cent by weight.

2. The method of forming a carbon body which comprises polymerizing trivinyl benzene to form a polymer body and dehydrogenating said body by heating it in a non-oxidizing atmosphere to at least 850° C.

3. The method of forming carbon spheres which comprises polymerizing trivinyl benzene in aqueous suspension to form a plurality of polymer spheres and dehydrogenating said spheres by heating them in a non-oxidizing atmosphere to a temperature of at least 1000° C.

4. The method described in claim 3 wherein the heating to a temperature of at least 1000° C. is carried out at such a rate that above 300° C. the temperature does not increase at a rate greater than 500° C. per hour.

5. The method described in claim 3 wherein the heating to a temperature of at least 1000° C. is carried out at such a rate that above 300° C. the temperature does not increase at a rate greater than 200° C. per hour.

6. The method described in claim 3 wherein, prior to dehydrogenation, the polymer spheres are baked in air at a temperature of about 250° C. for at least four hours.

7. The method of forming a carbon body which comprises polymerizing a trivinyl aromatic hydrocarbon to form a polymer body and dehydrogenating said body by heating it in a non-oxidizing atmosphere to a temperature of at least 850° C.

8. The method of forming an adherent, continuous carbon film on a refractory base comprising forming a film of polytrivinylbenzene on said base and dehydrogenating said film by heating it to at least 850° C. in a non-oxidizing atmosphere.

9. The method of forming a film having optical filter properties comprising forming a film of a polymer of trivinyl benzene on a transparent base and dehydrogenating said film by heating it in a non-oxidizing atmosphere until the hydrocarbon content has been reduced to between 3 per cent and 6 per cent by weight of the product.

References Cited in the file of this patent

UNITED STATES PATENTS

| | | |
|---|---|---|
| 1,156,509 | Weintraub et al. | Oct. 12, 1915 |
| 2,110,829 | Dreisbach | Mar. 8, 1938 |
| 2,502,183 | Swallen | Mar. 28, 1950 |
| 2,609,256 | Baker | Sept. 2, 1952 |

FOREIGN PATENTS

| | | |
|---|---|---|
| 329,652 | Great Britain | May 21, 1930 |

OTHER REFERENCES

Mowry et al.: Journal Amer. Chem. Soc., vol. 22, May 1950, pages 2037–8.

Pfeiffer: The Properties of Asphaltic Bitumens, Elsevier (1950), pages 9 and 24 to 26.

Mellor: Journ. Chemical Physics, vol. 15, pages 525 to 528 (1947).